(12) United States Patent
Mori et al.

(10) Patent No.: US 10,072,710 B2
(45) Date of Patent: Sep. 11, 2018

(54) COOLING STRUCTURE FOR BEARING DEVICE

(71) Applicant: NTN CORPORATION, Osaka (JP)

(72) Inventors: Masatsugu Mori, Kuwana (JP); Kikuo Fukada, Kuwana (JP); Yohei Yamamoto, Kuwana (JP); Masato Yoshino, Kuwana (JP); Yuushi Onda, Duesseldorf (DE)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/583,373

(22) Filed: May 1, 2017

(65) Prior Publication Data

US 2017/0234368 A1   Aug. 17, 2017

Related U.S. Application Data

(63) Continuation of application No. PCT/JP2015/080150, filed on Oct. 26, 2015.

(30) Foreign Application Priority Data

Nov. 6, 2014   (JP) .................................. 2014-226073

(51) Int. Cl.
*F16C 37/00*   (2006.01)
*F16N 21/00*   (2006.01)
(Continued)

(52) U.S. Cl.
CPC ............ *F16C 37/007* (2013.01); *B23Q 11/12* (2013.01); *F16C 19/16* (2013.01);
(Continued)

(58) Field of Classification Search
CPC .... F16C 37/007; F16C 19/16; F16C 33/6659; F16C 33/6662; F16C 33/664; B23Q 11/12; F16N 7/32; F16N 21/00; F16N 2210/14
(Continued)

(56) References Cited

U.S. PATENT DOCUMENTS 3,042,462 A * 7/1962 Rosskopf ............ F16C 33/6659
                                            184/6.26
4,759,427 A * 7/1988 Onose ................. F16C 33/6662
                                            184/39.1
(Continued)

FOREIGN PATENT DOCUMENTS

CN           1940323 A      4/2007
JP           57-116994      7/1982
                (Continued)

OTHER PUBLICATIONS

International Preliminary Report on Patentability dated May 18, 2017 in corresponding International Patent Application No. PCT/JP2015/080150.
(Continued)

*Primary Examiner* — Marcus Charles

(57) ABSTRACT

A bearing device includes a rolling bearing having an outer ring and an inner ring, an outer ring spacer disposed adjacent to the outer ring, and an inner spacer disposed adjacent the inner ring. The outer ring and the outer ring spacer are fitted to a housing, and the inner ring and the inner ring spacer are fitted to a rotary shaft. The outer ring spacer is provided with a nozzle, which is configured to inject a cooling fluid (R) toward an outer circumferential surface of the inner ring, and is inclined so that an injection port thereof is inclined forwardly in a rotation direction of the inner ring. An
(Continued)

inclination angle α of the nozzle with respect to an axial direction is set to a value within a range from 50° to 90°.

6 Claims, 5 Drawing Sheets

(51) Int. Cl.
  *B23Q 11/12*  (2006.01)
  *F16N 7/32*  (2006.01)
  *F16C 19/16*  (2006.01)
  *F16C 33/66*  (2006.01)

(52) U.S. Cl.
  CPC ............ *F16C 33/6659* (2013.01); *F16N 7/32* (2013.01); *F16N 21/00* (2013.01); *F16C 2322/39* (2013.01); *F16N 2210/14* (2013.01)

(58) Field of Classification Search
  USPC ............... 384/438, 462, 466–468, 473–474; 184/6.14, 55.1–55.2, 104.3
  See application file for complete search history.

(56) References Cited

U.S. PATENT DOCUMENTS

| | | | | |
|---|---|---|---|---|
| 6,176,349 | B1 * | 1/2001 | Kishi | F16C 19/163 |
| | | | | 184/55.1 |
| 6,328,478 | B1 * | 12/2001 | Fukuda | F16C 19/163 |
| | | | | 384/475 |
| 6,428,212 | B1 * | 8/2002 | Tanaka | B21B 31/076 |
| | | | | 384/475 |
| 6,443,623 | B2 * | 9/2002 | Sugita | F16C 33/6659 |
| | | | | 384/465 |
| 6,733,181 | B2 * | 5/2004 | Koiwa | F16C 33/6662 |
| | | | | 384/465 |
| 7,600,921 | B2 * | 10/2009 | Moller | B23Q 1/70 |
| | | | | 384/462 |
| 7,832,937 | B2 | 11/2010 | Suzuki | |
| 8,336,210 | B2 * | 12/2012 | Takiuchi | B23Q 1/70 |
| | | | | 29/898 |
| 8,562,224 | B2 * | 10/2013 | Duffy | F16C 33/6677 |
| | | | | 384/475 |
| 9,163,670 | B2 * | 10/2015 | Hayashi | F16C 33/46 |
| 9,541,137 | B2 | 1/2017 | Mori et al. | |
| 2007/0071382 | A1 | 3/2007 | Suzuki | |
| 2015/0226266 | A1 | 8/2015 | Mori et al. | |
| 2017/0051790 | A1 | 2/2017 | Mori et al. | |

FOREIGN PATENT DOCUMENTS

| | | |
|---|---|---|
| JP | 2000-249151 | 9/2000 |
| JP | 2004-142022 | 5/2004 |
| JP | 2007-10017 | 1/2007 |
| JP | 2007-92886 | 4/2007 |
| JP | 2014-62616 | 4/2014 |
| JP | 2014-62618 | 4/2014 |
| JP | 5515022 | 4/2014 |
| WO | WO 2014/046153 A1 | 3/2014 |

OTHER PUBLICATIONS

International Search Report dated Jan. 12, 2016 in corresponding International Application No. PCT/JP2015/080150.
Chinese Office Action dated Jul. 9, 2018 in corresponding Chinese Patent Application No. 201580060060.5.

* cited by examiner

Fig. 1B INNER RING ROTATION DIRECTION

INNER RING ROTATION DIRECTION

COOLING STRUCTURE FOR BEARING DEVICE

CROSS REFERENCE TO THE RELATED APPLICATION

This application is a continuation application, under 35 U.S.C. § 111(a), of international application No. PCT/JP2015/080150, filed Oct. 26, 2015, which claims priority to Japanese patent application No. 2014-226073, filed Nov. 6, 2014, the disclosure of which are incorporated by reference in their entirety into this application.

BACKGROUND OF THE INVENTION (Field of the Invention)

The present invention relates to a cooling structure for a bearing device, and relates to, for example, a cooling structure for a bearing device in a spindle device of a machine tool.

(Description of Related Art)

For spindle devices of machine tools, the temperature increase in the devices needs to be kept small in order to ensure the processing accuracy. However, the speed for, the recent machine tools tends to increase in order to, improve the processing efficiency, and the amount of heat generated from the bearing that supports the spindle also tends to increase, along with this increase in speed. The so-called motor built-in spindle devices including a driving motor incorporated therein are increasing in number, which also cause heat generation.

Heat generation during the rotation of the bearing leads to an increase in the pressure on the surface of contact between bearing rings and rolling elements, resulting, in an increased risk of damage to the bearing. Accordingly, in view of a higher speed and a higher precision of the spindle, the temperature increase in the bearing caused by heat generation needs to be minimized. As means for suppressing the temperature increase in the bearing, a method is available in which cooling is performed by injecting a cooling fluid formed of a mixture of an air and an oil, or formed of only an air to the bearing during operation.

By enhancing the bearing cooling effect by injecting the cooling fluid to the bearing during operation, the operation can be performed at a higher speed. However, an air curtain formed of a swirl flow about the axis is generated in the vicinity of revolving rolling elements, and injecting a large amount of the cooling fluid toward this air curtain results in the generation of sound of collision, which is collision noise. Therefore, it has been attempted to reduce noise by inclining the orientation of a nozzle configured to inject the cooling fluid, forwardly in the rotation direction of the spindle (e.g., Patent Documents 1 to 4).

RELATED DOCUMENT

Patent Document

[Patent Document 1] Japanese Patent No. 5515022
[Patent Document 2] JP Laid-open Patent Publication No. 2004-142022
[Patent Document 3] JP Laid-open Patent Publication No. 2014-062616
[Patent Document 4] JP Laid-open Patent Publication No. 2014-062618

SUMMARY OF THE INVENTION

According to Patent Documents 1 and 2, the collision noise between the air curtain and the cooling, fluid can be suppressed to a certain degree by injecting the cooling fluid along the swirl flow of the air curtain. However, the cooling fluid is still injected toward the air curtain and some collision noise is thus generated, failing to provide a sufficient countermeasure to noise.

According to Patent Document 3, the cooling fluid is injected toward the outer circumferential surface of an inner ring spacer from a nozzle provided at an outer ring spacer, and it is therefore possible to suppress the collision noise between the air curtain and the cooling fluid. However, an inner ring is cooled via the inner ring spacer, so that the cooling capability is inferior to that achieved by directly cooling the bearing with a cooling fluid.

According to Patent Document 4, the injection port of the nozzle provided at the outer ring spacer is extended to the vicinity of the outer circumferential surface of the inner ring, and the cooling fluid is sprayed to the outer circumferential surface of the inner ring. Accordingly, it can be expected to efficiently cool the bearing, while suppressing the generation of noise by avoiding a direct collision between the air curtain and the cooling fluid. However, a sufficient effect in reducing the noise and enhancing the cooling performance may not be achieved if the angle of the cooling fluid injected toward the outer circumferential surface of the inner ring is not proper, and it is therefore necessary to properly set the angle of the cooling fluid.

It is an object of the present invention to provide a cooling structure for a bearing device that can efficiently cool the bearing and effectively suppress the collision noise between a cooling fluid and an air curtain formed of a swirl flow generated in the vicinity of rolling elements.

A cooling structure for a bearing device according to the present invention is a cooling structure for a bearing device in which the bearing device includes a rolling bearing having an outer ring and an inner ring, an outer ring spacer disposed adjacent to the outer ring, and an inner ring spacer disposed adjacent to the inner ring, in which the outer ring and the outer ring spacer are fitted to a housing, and the inner ring and the inner ring spacer are fitted to a rotary shaft. The cooling structure includes a nozzle provided in the outer ring spacer, the nozzle being configured to inject a cooling fluid toward an outer circumferential surface of the inner ring, in which an injection port side of the nozzle is inclined forwardly in a rotation direction of the inner ring, and an inclination angle of the nozzle relative to an axial direction is in a range of 50° to 90°.

With this configuration, the inner ring is directly cooled with the cooling fluid by injecting the cooling fluid toward the outer circumferential surface of the inner ring from the nozzle provided at the outer ring spacer. Since the injection port side of the nozzle is provided forwardly in the rotation direction of the inner ring, the cooling fluid is in contact with the outer circumferential surface of the inner ring for a long time, so that a significant cooling effect is achieved. The inner ring is cooled with the cooling fluid, as a result of which the temperature difference between the inner and outer rings is reduced.

Since the injection port side of the nozzle is provided forwardly in the rotation direction of the inner ring, the difference in flow velocity between the cooling fluid injected from the injection port of the nozzle and the air curtain formed of a swirl flow caused by revolution of the rolling elements is decreased, making it possible to suppress the collision noise between the air curtain and the cooling fluid. However, when the inclination angle of the central axis of the injection port of the nozzle is too small, the difference in flow velocity between the cooling fluid injected from the nozzle and the air curtain is increased when the cooling fluid collides with the air curtain, so that the collision noise therebetween is also increased. Accordingly, the inclination angle may be within the range of 50° to 90°.

In one embodiment of the present invention, the cooling fluid may be a mixture of a compressed air and an oil. In this case, it is possible to perform the lubrication of the bearing concurrently with the cooling of the bearing.

In one embodiment of the present invention, the injection port of the nozzle may be located axially inwardly of an end face of the rolling bearing.

When the injection port of the nozzle is located axially inwardly of the end face of the rolling bearing, the distance between the injection port of the nozzle and the outer circumferential surface of the inner ring is shortened, so that the cooling fluid can be effectively sprayed to the outer circumfirential surface of the inner ring, resulting in an enhanced cooling effect. Since the cooling fluid does not directly collide with the air curtain, it is possible to suppress the generation of noise.

In one embodiment of the present invention, when the cooling fluid is a mixture of a compressed air and an oil, the outer circumferential surface of the inner ring to which the cooling fluid is sprayed with the nozzle may be an inclined surface whose outer diameter is decreased toward an end face side.

When the cooling fluid is sprayed to the outer circumferential surface of the inner ring, the oil contained in the cooling fluid is attached to the outer circumferential surface of the inner ring. The attached oil is caused to flow, by a centrifugal force resulting from the rotation of the inner ring, to the axially central side, which is the outer diameter side, of the outer circumferential surface, which is the inclined surface, of the inner ring, and is supplied to the rolling elements that require lubrication.

In one embodiment of the present invention, a circumferential groove may be provided on the outer circumferential surface, which is the inclined surface, of the inner ring.

When the circumferential groove is provided, the cooling fluid sprayed to the outer circumferential surface of the inner ring is temporarily accumulated in the circumferential groove, so that the oil contained in the cooling fluid is favorably attached to the outer circumferential surface of the inner ring, thus resulting in an enhanced lubrication.

The cooling structure for a bearing device according to the present invention has the above-described operation and effect, and thus is suitable to support a spindle of a machine tool.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly, understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 1B is a view of the cooling structure taken in the direction of an arrow IB in FIG. 1A, with a part thereof omitted;

DESCRIPTION OF EMBODIMENTS

Embodiments of the present invention will be described with reference to the drawings.

Figure 1A:
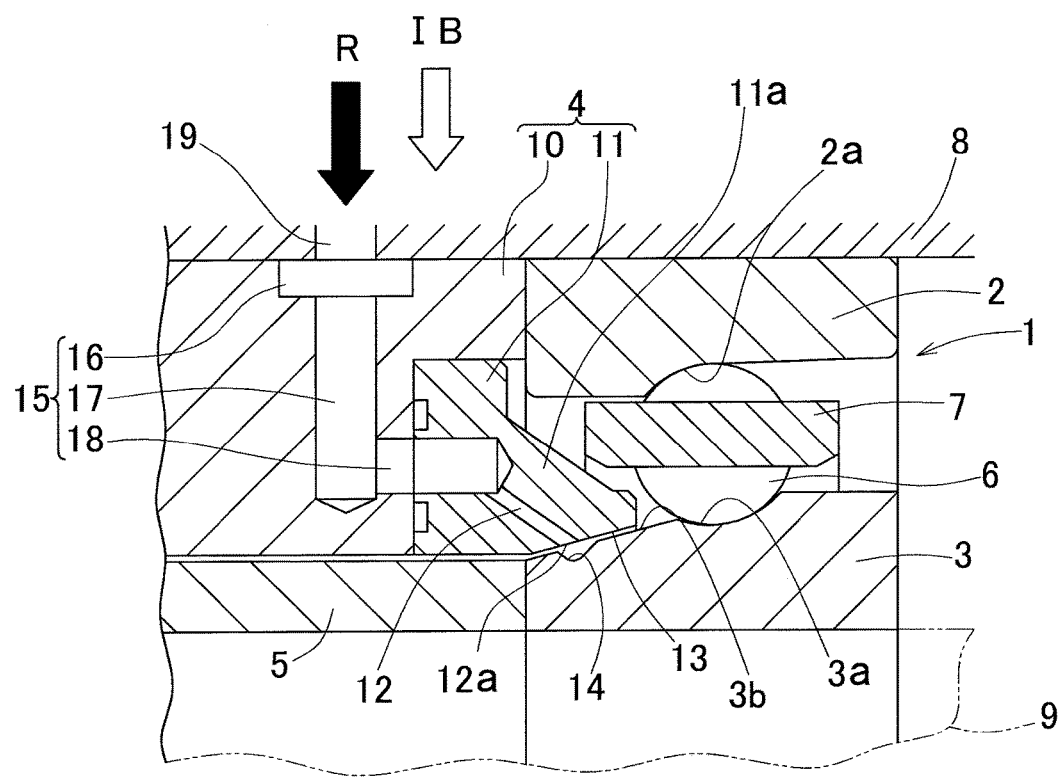
FIG. 1A is a cross-sectional view of a cooling structure for a bearing device according to a first embodiment of the present invention.
Figure 1A:
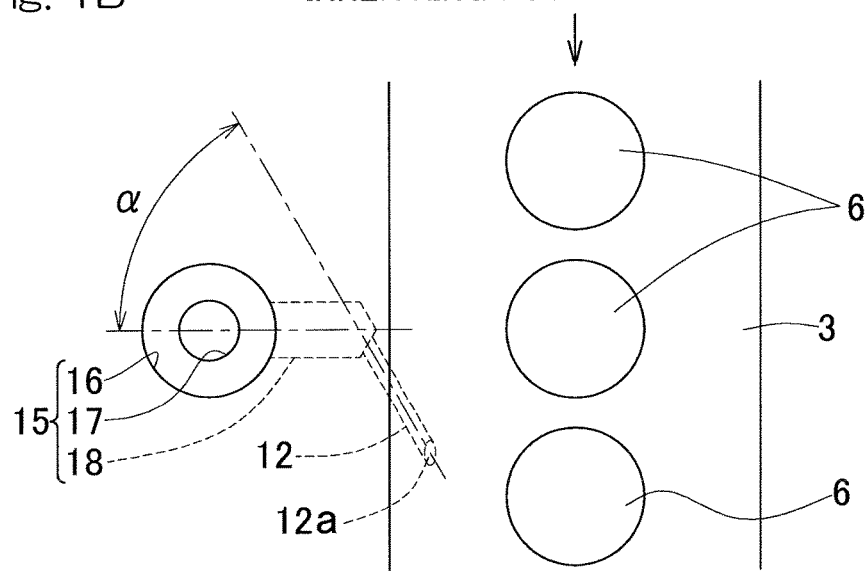

FIGS. 1A and 1B show a first embodiment of the present invention. The cooling structure for a bearing device, includes a rolling bearing 1 having ring 2 and an inner ring 3, an outer ring spacer 4 disposed adjacent to the outer ring 2 and an inner ring spacer 5 are disposed adjacent to the inner ring 3. The rolling bearing 1 is, for example, an angular ball bearing, and a plurality of rolling elements 6 are interposed between a raceway 3a of the inner ring 3 and a raceway 2a of the outer ring 2. The rolling elements 6 are retained equidistantly in the circumferential direction by a retainer 7. The outer ring 2 and the outer ring spacer 4 are installed by being loosely fitted to a housing 8. The inner ring 3 and the inner ring spacer 5 are tightly fitted to a rotary shaft 9. A portion of the outer circumferential surface of the inner ring 3 that extends from the raceway 3a to the end face on the inner ring spacer 5 side is formed as an inclined surface 3b whose outer diameter is decreased toward the end face side.

The outer ring spacer 4 includes an outer ring spacer body 10 having a portion on the inner diameter side facing the rolling bearing 1 is cut out over the circumference, and a ring-shaped nozzle member 11 that is fitted to the cutout is portion of the outer ring spacer body 10. The nozzle member 11 includes a nozzle 12 configured to supply a cooling fluid R to the rolling bearing 1. The nozzle 12 is provided at a protruding portion 11a of the nozzle member 11 that protrudes into the bearing, and an injection port 12a of the nozzle 12 is open at an inner circumferential surface of the protruding portion 11a. The inner circumferential surface of the protruding portion 11a opposes the inclined surface 3b of the outer circumferential surface of the inner ring 3 with a clearance 13 interposed therebetween. A circumferential groove 14 is provided at an axial position of the inclined surface 3b that opposes the injection port 12a.

A plurality of (for example, three) nozzles 12 are provided equidistantly in the circumferential direction. Each nozzle 12 extends linearly, and the injection port 12a side thereof is inclined forwardly in the rotation direction of the inner ring 3 as shown in FIG. 1B. The inclination angle α of the central axis of the injection port 12*a* of the nozzle 12 relative to the axial direction of the bearing device 1 is set to be within the range of 50° to 90° (50°≤α≤90°). More specifically, the inclination angle a may be within the range of 60° to 85° (60°≤α≤85°).

An introduction path 15 configured to introduce the cooling fluid R to the nozzle 12 is provided in the outer ring spacer body 10 and the nozzle member 11. The introduction path 15 is formed by a plurality (the same number as that of the nozzles 12) of external introduction ports 16 formed in the outer circumferential surface of the outer ring spacer body 10, radial holes 17 extending to the inner diameter side from the respective external introduction ports 16, and axial holes 18 extending in the axial direction from the bottom portions of the radial holes 17. Each axial hole 18 is formed across the outer ring spacer body 10 and the nozzle member 11. The leading end of the axial hole 18 is in communication with an opening of the nozzle 12 that is located opposite to the injection port 12*a*.

In the bearing device according to the present embodiment, an air-oil that carries a liquid oil with a compressed air are used as the cooling fluid R. An air-oil supply device (not shown) is provided outside the spindle device, and the cooling fluid R composed of an air-oil supplied from the air-oil supply device is sent to each nozzle 12 through an air-oil, supply path 19 in the housing 8 and the introduction path 15 in the outer ring spacer 4.

The operation of the cooling structure for a bearing device will be described.

The cooling fluid R that has been injected from each nozzle 12 is sprayed to the inclined surface 3*b* of the inner ring 3, to directly cool the inner ring 3. Since the injection port 12*a* of the nozzle 12 is located axially inwardly of the end face of the roiling bearing 1 and thus the distance between the injection port 12*a* of the nozzle 12 and the inclined surface 3*b* of the inner ring 3 is close, it is possible to effectively spray the cooling fluid R to the inclined surface 3*b* of the inner ring 3. Since the injection port 12*a* side of the nozzle 12 is directed forwardly in the rotation direction of the inner ring 3, the cooling fluid R is in contact with the inclined surface 3*b* of the inner ring 3 for a long time, so that a significant cooling effect is achieved. The cooling fluid R that has impinged on the inclined surface 3*b* of the inner ring 3 flows inwardly in the axial direction of the bearing along the inclined surface 3*b* of the inner ring 3, to cool the rolling elements 6. The rolling, elements 6 are also cooled by the inner ring 3 that has been cooled earlier. Thus, by cooling the inner ring 3 and the rolling elements 6, which are heat generation sources of the bearing, by using the cooling fluid R, it is possible to efficiently cool the bearing.

Although an air curtain formed of a swirl flow about the axis that is caused by the revolution of each rolling element 6 is generated in the periphery of the rolling element 6, the cooling fluid R will not directly collide with the air curtain since the cooling fluid R is injected toward the inclined surface 3*b* of the inner ring 3 with the nozzles 12. Since the injection port 12*a* side of each nozzle 12 is provided forwardly in the rotation direction of the inner ring 3, the difference in flow velocity between the cooling fluid R injected from the nozzle 12 and the air curtain is decreased, so that it is possible to suppress the collision noise between the air curtain and the cooling fluid R.

However, when the inclination angle α of the central axis of the injection port 12*a* of the nozzle 12 is too small, the difference in flow velocity between the cooling fluid R injected from the nozzle 12 and the air curtain is increased when the cooling fluid R collides with the air curtain, so that the collision noise therebetween is also increased. Therefore, as described previously, it is preferable that the inclination angle α is within the range of 50°≤α≤90°. Taking into consideration the processability, the lubrication reliability, the noise reduction and so for the nozzle 12, in a comprehensive manner, the inclination angle a may be within the range of 60°≤α≤85°.

The oil contained in the cooling fluid R sprayed to the inclined surface 3*b* of the inner ring 3 is attached to the inclined surface 3*b* of the inner ring 3. The attached oil is caused to flow, by a centrifugal force resulting from the rotation of the, inner ring 3, to the axially central side, which is the outer diameter side of the inclined surface 3*b*, while being attached to the inclined surface 3*b*, and is supplied to the rolling elements 6 that require lubrication. In particular, when the circumferential groove 14 is provided in the inclined surface 3*b* as in the present embodiment, the cooling fluid R sprayed to the inclined surface 3*b* is temporarily accumulated in the circumferential groove 14, so that the oil contained in the cooling fluid R is favorably attached to the inclined surface 3*b*, thus resulting in an enhanced lubrication.

Figure 2A:
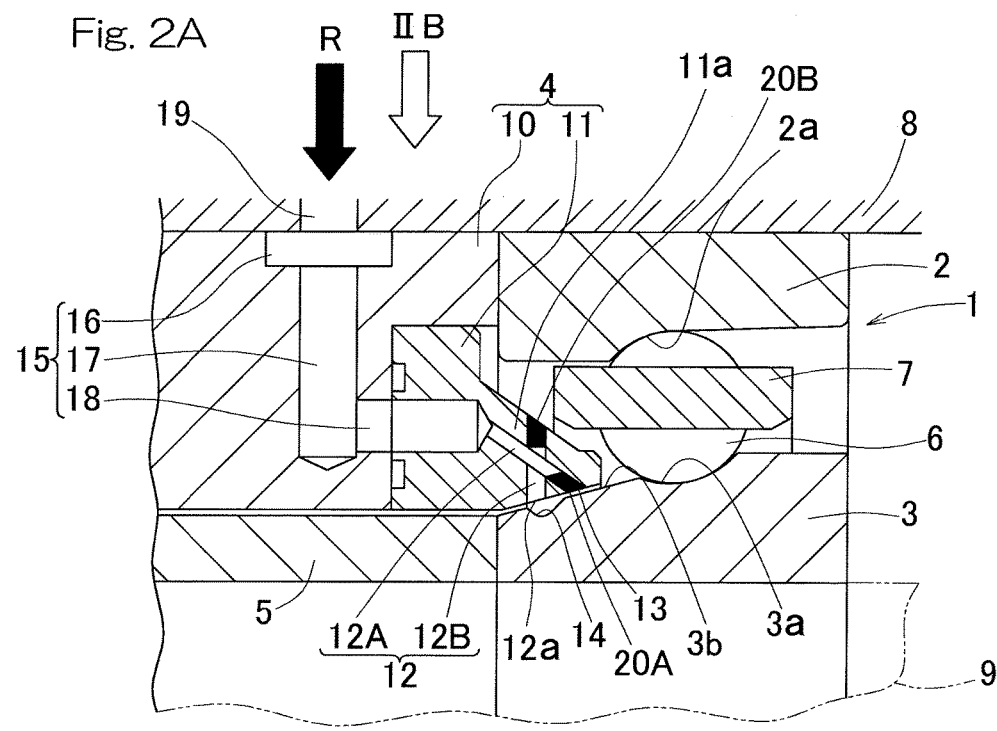
FIG. 2A is a cross-sectional view of a cooling structure for a bearing device according to a second embodiment of the present invention.
Figure 2B:
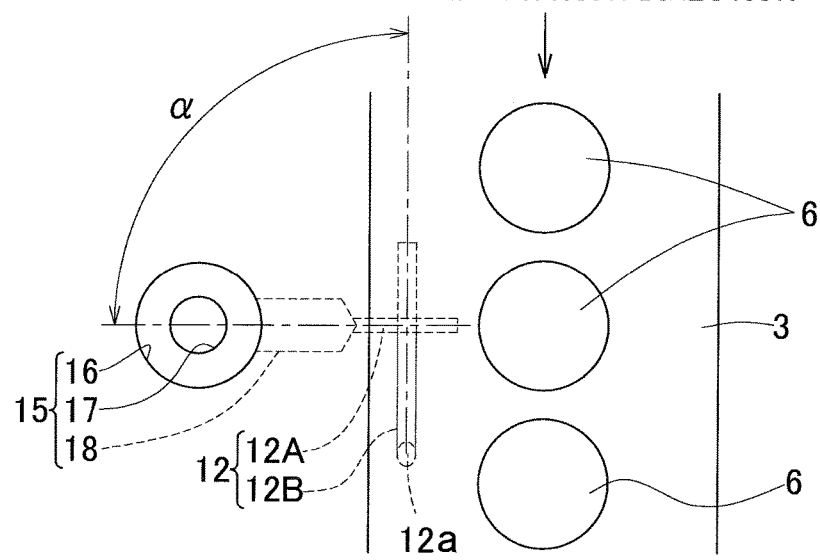
FIG. 2B is a view of the cooling structure taken in the direction of an arrow IIB in FIG. 2A, with a pan thereof omitted.

FIGS. 2A and 2B show a second embodiment of the present invention. In this cooling structure for a bearing device, the inclination angle α of the central axis of the injection port 12*a* of each nozzle 12 is set to be parallel to the inner ring rotation direction, i.e., α=90°. The nozzle 12 includes: a first nozzle hole portion 12A extending obliquely to the inner diameter side from the leading end of the corresponding axial hole 18 of the introduction path 15, perpendicularly to the inner ring rotation direction as viewed in the radial direction; and a second nozzle hole portion 12B extending to the inner diameter side from the leading end of the nozzle hole 12A, parallel to the rotation direction of the inner ring 3. The nozzle hole portions 12A and 12B are both formed as through holes, and thereafter, portions of the through holes that require closing are closed by plug members 20A and 20B.

By forming each nozzle 12 in this manner, the inclination angle α of the central axis of the injection port 12*a* can be set to be parallel to the rotation direction of the inner ring 3, i.e., 90°. This can increase the time for which the cooling fluid R is in contact with the inclined surface 3*b* of the inner ring 3 so as to increase the bearing cooling effect, and can decrease the velocity difference between the cooling fluid R and the air curtain so as to further reduce the collision noise. However, due to its complex shape, the nozzle hole 12 requires a burdensome process of forming two through holes serving as the first nozzle hole portion 12A and the second nozzle hole portion 12B, and then closing portions of the through holes by the plug members 20A and 20B.

Figure 3A:
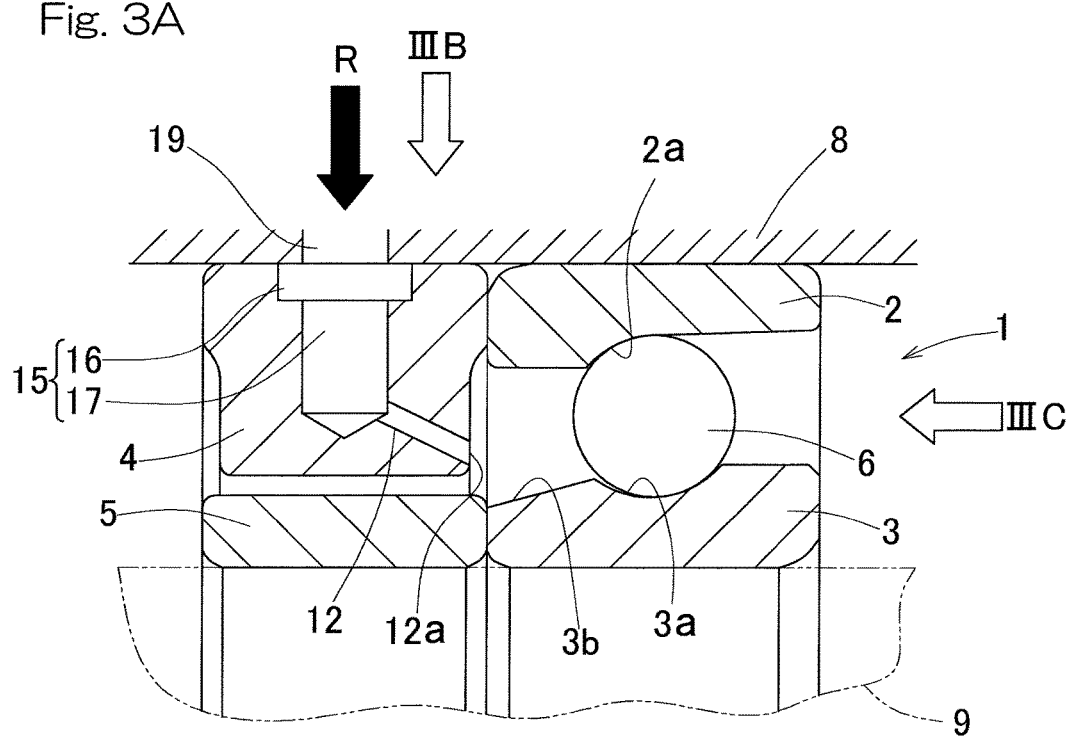
FIG. 3A is a cross-sectional view of a cooling structure for a bearing device according to a third embodiment of the present invention.
Figure 3B:
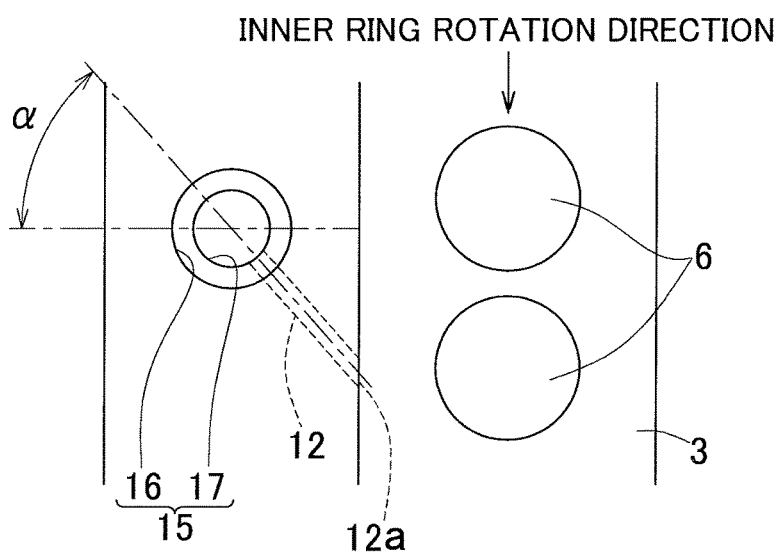
FIG. 3B is a view of the cooling structure taken in the direction of an arrow IIIB in FIG. 3A, with a part thereof omitted.
Figure 3C:
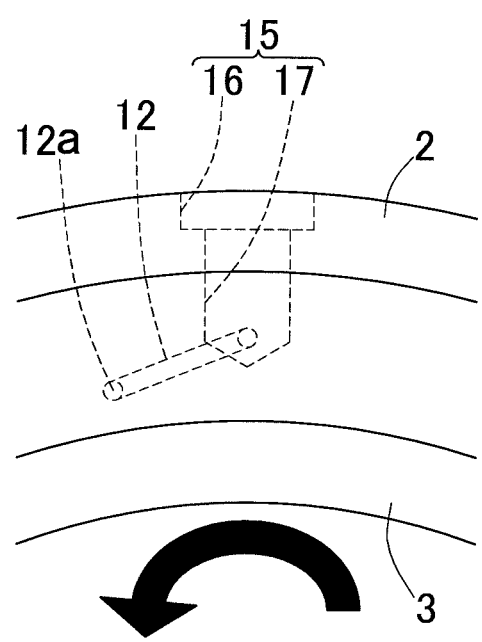
FIG. 3C is a view of the cooling structure taken in the direction of an arrow IIIC in FIG. 3A, with a part thereof omitted.

FIGS. 3A, 3B, and 3C show a third embodiment of the present invention. Unlike the first and second embodiments, this cooling structure for a bearing device includes an outer ring spacer 4 constituted by a single member, and does not include the protruding portion 11*a* protruding into the bearing; and the injection port 12*a* of each nozzle 12 is open at a position axially outward of the end face of the inner ring 3. The central axis of the injection port 12*a* is oriented to the inclined surface 3*b* of the inner ring 3, and the inclination angle α thereof relative to the axial direction of the bearing device 1 is within the range of 50° or greater but less than 90° (50°≤α≤90°). The introduction path 15 configured to introduce the cooling fluid R to each nozzle 12 is formed by an external introduction port 16 and a radial hole 17, and the leading end of the radial hole 17 is in communication with the opening of the nozzle 12 that is located opposite to the injection port 12a.

In the case of this cooling structure for a bearing device, the cooling fluid R is injected from the nozzle 12 toward the inclined surface 3b of the inner ring 3. However, the distance between the injection port 12a of the nozzle 12 and the inclined surface 3b is long, so that most of the oil contained in the cooling fluid R is directly attached to the rolling elements 6 without being attached to the inclined surface 3b. At that time, it is necessary to maintain a large component of force, in the axial direction, of the flow velocity of the cooling fluid R in order to allow the cooling fluid R containing an oil to penetrate the air curtain and to flow to the rolling element 6 side. Therefore, it is difficult to increase the inclination angle α, as compared with the cooling structures for a bearing device shown in FIGS. 1A and 1B and FIGS. 2A and 2B.

Figure 4:
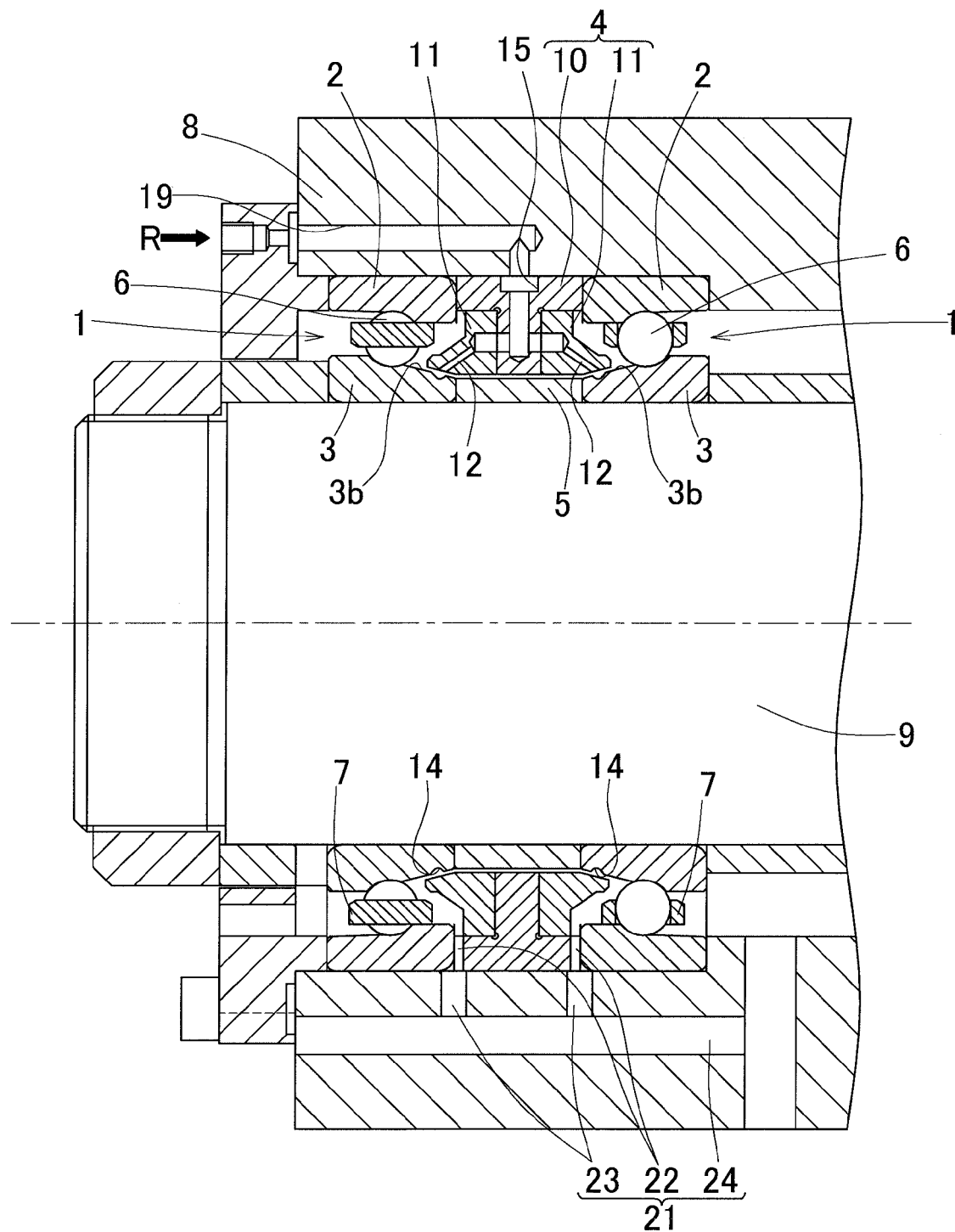
FIG. 4 is a cross-sectional view of a spindle device of a machine tool that uses the bearing device shown in FIG. 1A.

FIG. 4 shows a state in which the bearing device shown in FIGS. 1A and 1B is used to support a spindle of a machine tool. In this case, a rotary shaft 9 serving as the spindle is supported by a pair of rolling bearings 1, 1.

Accordingly, the bearing device is formed of the pair of rolling bearings 1, 1, and the outer ring spacer 4 and the inner ring spacer 5 which are interposed between the two rolling bearings 1, 1. The outer ring spacer 4 in this case is composed of an outer ring spacer body 10 having a substantially T-shaped cross section, and a pair of ring-shaped nozzle members 11, 11 disposed on opposite sides of a portion of the outer ring spacer body 10 that corresponds to the vertical portion of the T-shape. The injection port 12a of the nozzle 12 is open at the inner circumferential surface of the protruding portion 11a of each nozzle member 11.

Apart from the air-oil supply path 19, an exhaust path 21 is provided in the outer ring spacer 4 and the housing 8. The exhaust path 21 includes: an outer ring spacer-side exhaust groove 22 provided at a portion, in the circumferential direction, of the outer ring spacer body 10; a housing-side exhaust groove 23 that is formed in the housing 8 and is in communication with the exhaust groove 22; and an axially extending exhaust hole 24 that brings the housing-side exhaust groove 23 in communication with the outside of the housing 8. Part of the cooling fluid R injected from the nozzle 12 is passed through the bearing in the axial direction so as to be released to the outside of the housing 8, and the rest is discharged to the outside of the housing 8 via the exhaust path 21.

As described previously, the cooling structure for a bearing device shown in FIGS. 1A and 1B can efficiently cool the rolling bearing 1, suppress the collision noise between the air curtain generated in the vicinity of the rolling elements 6 and the cooling fluid R, and favorably lubricate the rolling bearing 1, and is therefore suitable to support a spindle of a machine tool. The cooling structure for a hearing device shown in FIGS. 2A and 2B or FIGS. 3A to 3C may he applied to support a spindle of a machine tool.

Although the air-oil that carries a liquid oil with compressed air are used as the cooling fluid R in each of the above-described embodiments, it is possible to use oil mist that carries an atomized oil with compressed air. Alternatively, he cooling fluid R may be formed solely of compressed air that does not contain oil.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope. of the present invention as delivered from the claims annexed hereto, to be construed as included therein.

REFERENCE NUMERALS

1 . . . Rolling hearing
2 . . . Outer ring
3 . . . Inner ring
3b . . . Inclined surface (Outer circumferential surface)
4 . . . Outer ring spacer
5 . . . Inner ring spacer
8 . . . Housing
9 . . . Rotary shaft
12 . . . Nozzle
12a . . . Injection port
R . . . Cooling fluid

What is claimed is:

1. A bearing device comprising:
a rolling bearing having an outer ring and an inner ring;
an outer ring spacer disposed adjacent to the outer ring;
an inner ring spacer disposed adjacent to the inner ring;
the outer ring and the outer ring spacer adapted to be fitted to a housing;
the inner ring and the inner ring spacer adapted to be fitted to a rotary shaft; and
a cooling structure comprising a nozzle provided in the outer ring spacer, the nozzle being configured to inject a cooling fluid toward an outer circumferential surface of the inner ring,
wherein an injection port side of the nozzle is inclined forwardly in a rotation direction of the inner ring by an inclination angle α relative to an axial direction, the inclination angle α being within a range of 50° to 90°.

2. The bearing device as claimed in claim 1, wherein the cooling fluid is a mixture of compressed air and oil.

3. The bearing device as claimed in claim 1, wherein the injection port of the nozzle is located axially inwardly of an end face of the rolling bearing.

4. The bearing device as claimed in claim 1, wherein the cooling fluid is a mixture of a compressed air and an oil, and the outer circumferential surface of the inner ring to which the cooling fluid is sprayed with the nozzle is an inclined surface whose outer diameter is decreased toward an end face side.

5. The bearing device as claimed in claim 4, wherein a circumferential groove is provided in the outer circumferential surface, which is the inclined surface, of the inner ring.

6. The bearing device as claimed in claim 1, wherein the rotary shaft is a spindle of a machine tool.

\* \* \* \* \*